US012646294B2

(12) United States Patent
Li et al.

(10) Patent No.: US 12,646,294 B2
(45) Date of Patent: Jun. 2, 2026

(54) METHOD AND DEVICE FOR ADJUSTING PARMETERS OF MACHINE LEARNING MODEL

(71) Applicants: HON HAI PRECISION INDUSTRY CO., LTD., New Taipei City (TW); Foxconn Technology Group Co., Ltd., Guangdong Province (CN)

(72) Inventors: Yung-Hui Li, New Taipei City (TW); Shen-Hsuan Liu, New Taipei City (TW); Van Nhiem Tran, New Taipei City (TW); Kai-Lin Yang, New Taipei City (TW)

(73) Assignees: HON HAI PRECISION INDUSTRY, New Taipei City (TW); Foxconn Technology Group Co., Ltd., Guangdong Province (CN)

( * ) Notice: Subject to any disclaimer, the term of this patent is extended or adjusted under 35 U.S.C. 154(b) by 509 days.

(21) Appl. No.: 18/169,853

(22) Filed: Feb. 15, 2023

(65) Prior Publication Data

US 2023/0260260 A1     Aug. 17, 2023

Related U.S. Application Data

(60) Provisional application No. 63/268,064, filed on Feb. 16, 2022.

(51) Int. Cl.
*G16H 30/40*        (2018.01)
*G06N 20/00*        (2019.01)
(Continued)

(52) U.S. Cl.
CPC .......... *G06V 10/774* (2022.01); *G06V 10/771* (2022.01); *G06V 10/7715* (2022.01)

(58) Field of Classification Search
CPC ............... G06V 10/774; G06V 10/771; G06V 10/7715; G06V 10/26; G06V 10/82; Y02T 10/40; G06N 20/00; G06N 3/08
See application file for complete search history.

(56) References Cited

U.S. PATENT DOCUMENTS 6,288,703 B1     9/2001   Berman et al.
2020/0394459 A1*  12/2020  Xu ......................... G06N 3/045
(Continued)

FOREIGN PATENT DOCUMENTS

CN        110163344 A    8/2019
CN        110874860 A    3/2020
(Continued)

OTHER PUBLICATIONS

Rui Xu, et al., "Focused Mean Square Loss Function Design in Convolutional Neural Network", Computer Systems & Applications, Sep. 30, 2020, 29(10), p. 133-140, P.R.China. doi: 10.15888/j.cnki.csa.007651.
(Continued)

*Primary Examiner* — Amandeep Saini
*Assistant Examiner* — Mehrazul Islam
(74) *Attorney, Agent, or Firm* — CKC & Partners Co., LLC

(57)        ABSTRACT
A machine learning method comprises: (a) applying a contrastive learning model to a training image and an image mask to generate a foreground feature vector pair and a background feature vector pair; (b) calculating a foreground loss and a background loss according to the foreground feature vector pair and the background feature vector pair; (c) calculating a total loss from the foreground loss and the background loss; (e) when a recursion end condition is met, using a first encoder for parameter adjustment of machine learning model; and (f) when the recursive end condition is
(Continued)

not met, adjusting a parameter of the first encoder in the contrastive learning model using the total loss, and adjust a parameter of a second encoder in the contrastive learning model using the adjusted parameter of the first encoder and a preset multiple, thereby performing step (a) to step (d) again.

20 Claims, 6 Drawing Sheets

(51) Int. Cl.

| | |
|---|---|
| *G06V 10/77* | (2022.01) |
| *G06V 10/771* | (2022.01) |
| *G06V 10/774* | (2022.01) |
| *G16H 50/20* | (2018.01) |

(56) References Cited

U.S. PATENT DOCUMENTS

| | | | |
|---|---|---|---|
| 2021/0027470 A1* | 1/2021 | Lin | G06T 11/60 |
| 2021/0142479 A1* | 5/2021 | Phogat | G06T 11/206 |
| 2021/0327029 A1 | 10/2021 | Chen et al. | |
| 2022/0262006 A1* | 8/2022 | Park | G06T 7/194 |

FOREIGN PATENT DOCUMENTS

| | | |
|---|---|---|
| CN | 111489372 A | 8/2020 |
| WO | 2021216310 A1 | 10/2021 |

OTHER PUBLICATIONS

Lichao Chen, et al., "Multi-scenario lane line detection with auxiliary loss", Journal of Image and Graphics, Sep. 16, 2020, 25(09), p. 1882-1893, P.R.China. doi: 10.11834/jig.190646.

Dong Bo, et al., "Saliency detection hybrid information flows based on sub-network cascading", Opto-Electronic Engineering, Jul. 15, 2020, 47(7), article 190627, p. 1-12, P.R.China. doi: 10.12086/oee.2020.190627.

Fatemehsadat Saleh et al., "Built-in Foreground/Background Prior for Weakly-Supervised Semantic Segmentation", Sep. 2, 2016, arXiv, Cornell University, United States.

\* cited by examiner

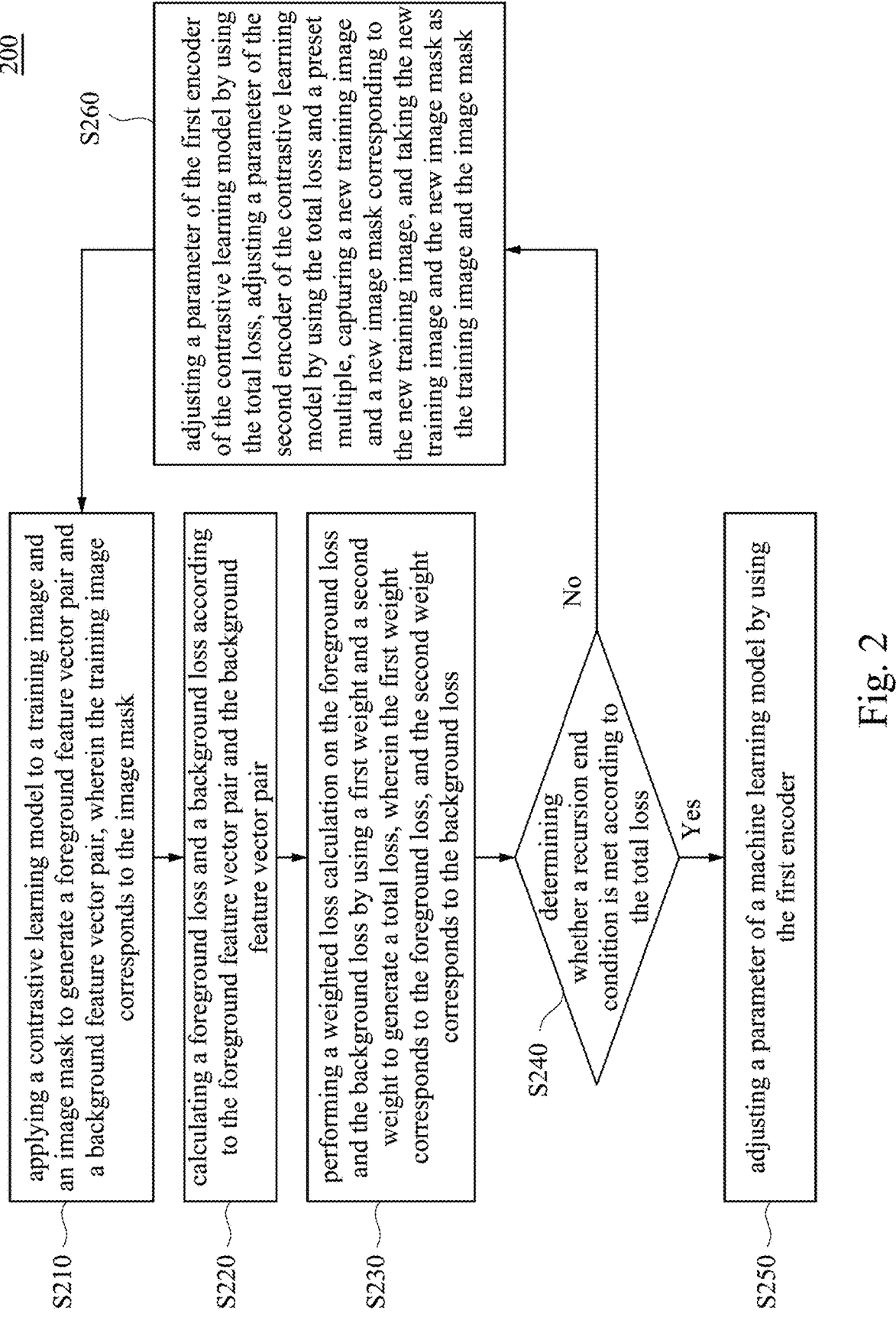

200

S210 — applying a contrastive learning model to a training image and an image mask to generate a foreground feature vector pair and a background feature vector pair, wherein the training image corresponds to the image mask S220 — calculating a foreground loss and a background loss according to the foreground feature vector pair and the background feature vector pair S230 — performing a weighted loss calculation on the foreground loss and the background loss by using a first weight and a second weight to generate a total loss, wherein the first weight corresponds to the foreground loss, and the second weight corresponds to the background loss S240 — determining whether a recursion end condition is met according to the total loss No S260 — adjusting a parameter of the first encoder of the contrastive learning model by using the total loss, adjusting a parameter of the second encoder of the contrastive learning model by using the total loss and a preset multiple, capturing a new training image and a new image mask corresponding to the new training image, and taking the new training image and the new image mask as the training image and the image mask Yes S250 — adjusting a parameter of a machine learning model by using the first encoder

Fig. 2

METHOD AND DEVICE FOR ADJUSTING PARMETERS OF MACHINE LEARNING MODEL

CROSS-REFERENCE TO RELATED APPLICATION

This application claims priority to U.S. Provisional Application Ser. No. 63/268,064, filed Feb. 16, 2022, which is herein incorporated by reference in its entirety.

BACKGROUND

Field of Invention

The present invention relates to a machine learning method and device.

Description of Related Art

In the prior art, during training a machine learning model, the recognition capability of the model is not only effected by the structure of the model, more significantly, is effected by the integrity of the training data. To models with the same structure, the recognition capabilities of the models will be higher (i.e., higher accuracy) with the higher diversity and higher integrity of the training data. However, owing to the restraint of resources in practice, it is hard to obtain a training database with high diversity and high integrity. Furthermore, in the aspect of machine learning, massive training samples and tags are needed for various downstream tasks, and it would consume lots of human resources. Therefore, in order to reduce the number of training samples and tags, how to present the essential detail precisely for the downstream tasks is a key subject of machine learning.

SUMMARY

The invention provides a machine learning method. The machine learning method comprises the following steps. (a) A contrastive learning model is applied to a training image and an image mask to generate a foreground feature vector pair and a background feature vector pair, wherein the training image corresponds to the image mask, and the contrastive learning model comprises a first encoder and a second encoder. (b) A foreground loss and a background loss are calculated according to the foreground feature vector pair and the background feature vector pair. (c) A weighted loss calculation on the foreground loss and the background loss is performed by using a first weight and a second weight to generate a total loss, wherein the first weight corresponds to the foreground loss, and the second weight corresponds to the background loss. (d) Whether a recursion end condition has been met is determined according to the total loss. (e) A parameter of a machine learning model is adjusted by using the first encoder when the recursion end condition is met. (f) A parameter of the first encoder is adjusted by using the total loss, a parameter of the second encoder is adjusted by using the adjusted parameter of the first encoder and a preset multiple, a new training image and a new image mask corresponding to the new training image are captured, and step (a) to step (d) are performed by taking the new training image and the new image mask as the training image and the image mask when the recursion end condition is not met.

The present disclosure further provides a machine learning device that comprises an image capture circuit and a processor. The image capture circuit is configured to capture a training image. The processor connects to the image capture circuit. The processor runs a contrastive learning model. The processor is configured to perform an object recognition process of the training image to generate an image mask corresponding to the training image. The processor is further configured to apply the contrastive learning model to the training image and the image mask to generate a foreground feature vector pair and a background feature vector pair. The processor is further configured to calculate a foreground loss and a background loss according to the foreground feature vector pair and the background feature vector pair. The processor is further configured to perform a weighted loss calculation on the foreground loss and the background loss by using a first weight and a second weight to generate a total loss, wherein the first weight corresponds to the foreground loss, and the second weight corresponds to the background loss. The processor is further configured to adjust a parameter of the first encoder by using the total loss, wherein the trained first encoder is configured to adjust a parameter of a machine learning model.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2 is a flow diagram illustrating a machine learning method of the present disclosure.

DETAILED DESCRIPTION

Figure 1:
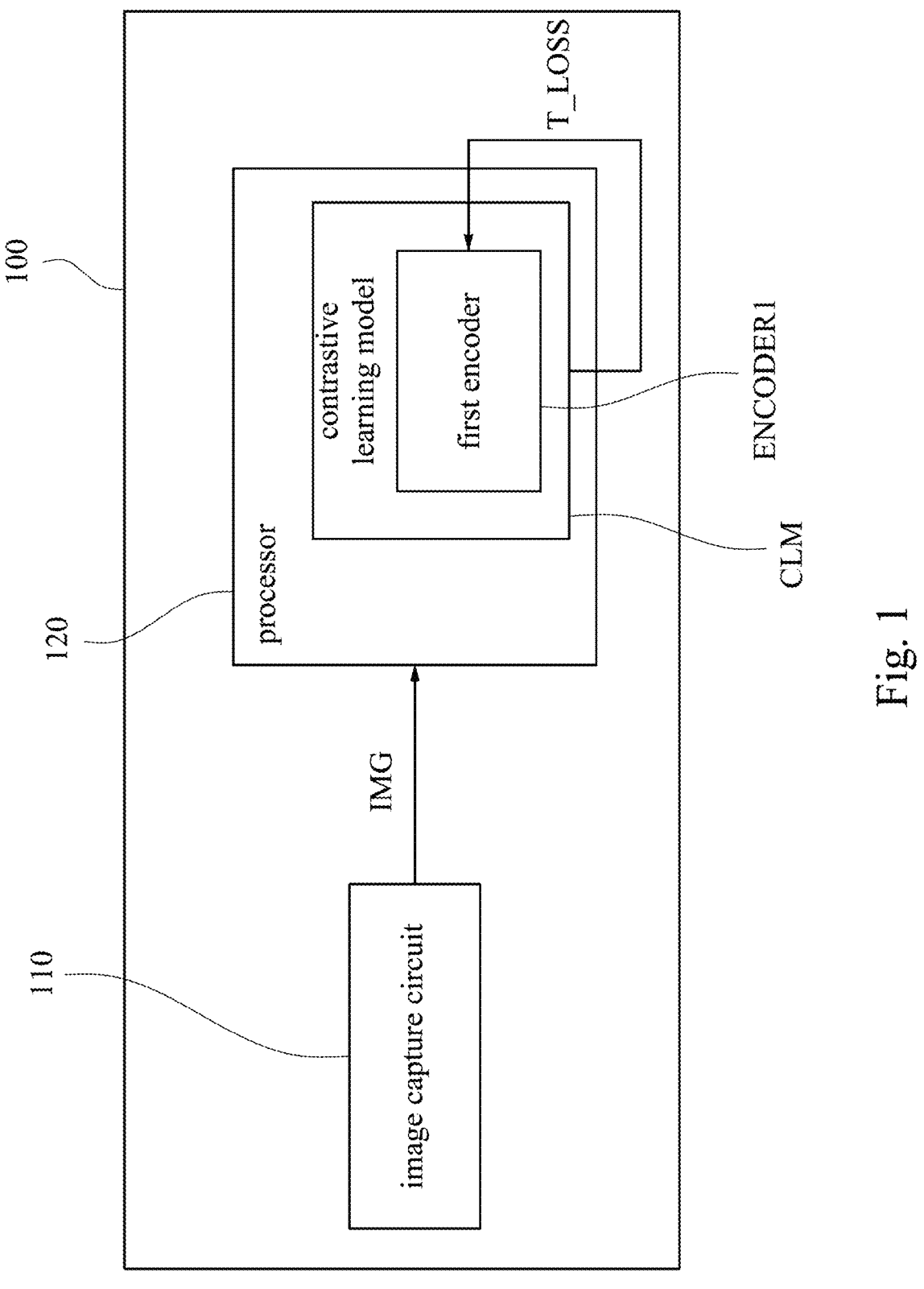
FIG. 1 is a block diagram illustrating a machine learning device of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 is a block diagram illustrating a machine learning device 100 of the present disclosure. In this embodiment, the machine learning device 100 comprises an image capture circuit 110 and a processor 120. The image capture circuit 110 is configured to capture training image IMG. The processor 120 is connected to the image capture circuit 110.

In some embodiments, the machine learning device 100 can be built by a computer, a server, or a process center. In some embodiments, the image capture circuit 110 can be a data access circuit configured to capture images, a video camera, or a camera capable of taking images continuously. For example, the image capture circuit 110 can be a digital single-lens reflex camera (DSLR), a digital video camera (DVC), or a near-infrared camera (NIRC). In some embodiments, the processor 120 comprises a processing unit, a central processing unit (CPU), or a computing unit.

In some embodiments, the machine learning device 100 is not limited to comprise the image capture circuit 110 and the processor 120, and further comprises other necessary components configured to implement functions and applications of the machine learning device 100. For example, the machine learning device 100 can further comprises an output interface (e.g., a display panel configured to display information), an input interface (e.g., a touch panel, a keyboard, a microphone, a scanner, or a flash memory reader), and a communication circuit (e.g., WiFi communication model, Bluetooth communication model, wireless telecommunication network communication model, etc.).

As shown in FIG. 1, the processor 120 executes a contrastive learning model CLM based on a corresponding software or firmware command program. In some embodiments, the processor 120 can further execute object recognition process of the training image IMG based on the corresponding software or firmware instruction program to generate an image mask corresponding to the training image IMG. For example, a value of a pixel having an object in the training image IMG can be set as 1, a value of a pixel not having the object in the training image IMG can be set as 0 to generate a binary mask, and the binary mask is taken as the image mask corresponding to the training image IMG.

It is noticed that, the object recognition process can be based on conventional machine learning algorithms configured to recognize an object in an image (e.g., semantic analysis algorithms or computer vision algorithms) for object recognition, and there is no particular limitation. In addition, the image mask can be not only a binary mask, but also a three degrees-of-freedom mask (3 DOF mask), a multiple DOF mask, etc.

In some embodiments, the contrastive learning model CLM can be configured to extract foreground features and background features form the training image IMG and the image mask to generate a foreground feature vector pair and a background feature vector pair, wherein the foreground feature vector pair comprises a first foreground feature vector and a second foreground feature vector, and the background feature vector pair comprises a first background feature vector and a second background feature vector, wherein the first foreground feature vector corresponds to the first background feature vector, and the second foreground feature vector corresponds to the second background feature vector.

As shown in FIG. 1, the processor 120 can further execute a first encoder ENCODER1 of the contrastive learning model CLM based on a corresponding software or firmware command program. It is noticed that, the first encoder ENCODER1 can be any type of image encoder, and there is no particular limitation.

In this embodiment, the processor 120 calculates a foreground loss and a background loss according to the foreground feature vector pair and the background feature vector pair. Next, the processor 120 performs a weighted loss calculation on the foreground loss and the background loss by using a first weight and a second weight to generate a total loss T_LOSS, wherein the first weight corresponds to the foreground loss, and the second weight corresponds to the background loss. Accordingly, the processor 120 updates the first encoder ENCODER1 according to the total loss T_LOSS, and the detailed method will be discussed in following paragraphs.

Reference is also made to FIG. 2. FIG. 2 is a flow diagram illustrating a machine learning method 200 of the present disclosure. The method of the embodiment shown in FIG. 2 is applicable to the machine learning device 100 of FIG. 1, but is not limited thereto. For clarity, reference is made to FIG. 1 and FIG. 2 at the same time, the detailed steps of the machine learning method 200 shown in FIG. 2 are illustrated by the process between components of the machine learning device 100 shown in FIG. 1.

In this embodiment, the machine learning method 200 comprises steps S210 to S260, and the steps of the machine learning method 200 can be executed by the processor 120. First, in step S210, a contrastive learning model CLM is applied to a training image IMG and an image mask to generate a foreground feature vector pair and a background feature vector pair, wherein the training image IMG corresponds to the image mask.

In some embodiments, the contrastive learning model CLM comprises a data augmentation submodel. In some embodiments, the training image IMG and the image mask can be transformed to a first data augmentation image, a second data augmentation image, a first data augmentation mask, and a second data augmentation mask by using the data augmentation submodel, wherein the first data augmentation image corresponds to the first data augmentation mask, and the second data augmentation image corresponds to the second data augmentation mask.

In some embodiments, the contrastive learning model CLM can further comprise a second encoder. In some embodiments, a preset multiple exists between a parameter of the first encoder ENCODER1 and a parameter of the second encoder, and the first encoder ENCODER1 and the second encoder have the same structure, wherein the preset multiple can be an average value obtained from training experiences in the past or a manual preset value. In some embodiments, the first encoder ENCODER1 and the second encoder can be residual networks, visual geometry group networks (VGG networks), etc. For example, the parameter of the first encoder ENCODER1 is 0.9 times the parameter of the second encoder, and the first encoder ENCODER1 and the second encoder are ResNet50 structures.

In some embodiments, a first geometric transformation on the training image IMG and the image mask is performed by using the data augmentation submodel to generate a first geometric transformed image and the first data augmentation mask corresponding to the first geometric transformed image. Next, a second geometric transformation on the training image IMG and the image mask can be performed by using the data augmentation submodel to generate a second geometric transformed image and the second data augmentation mask corresponding to the second geometric transformed image, wherein the second geometric transformation is different from the first geometric transformation. After that, a first image feature map can be generated by using the first encoder ENCODER1 according to the first geometric transformed image, a second image feature map can be generated by using the second encoder according to the second geometric transformed image, and the foreground feature vector pair and the background feature vector pair can be generated according to the first image feature map and the second image feature map.

In some embodiments, the first geometric transformation and the second geometric transformation can be an image process related to the position of an object, such as image cropping, image flipping, image rotation, and image translation.

In some embodiments, a first color transformation on the first geometric transformed image is performed by using the data augmentation submodel to generate the first data augmentation image. Next, a second color transformation on the second geometric transformed image can be performed by using the data augmentation submodel to generate the second data augmentation image, wherein the second color transformation is different from the first color transformation. After that, the first image feature map can be generated by using the first encoder ENCODER1 according to the first data augmentation image, the second image feature map can be generated by using the second encoder according to the second data augmentation image, and the foreground feature vector pair and the background feature vector pair can be generated according to the first image feature map and the second image feature map.

In some embodiments, the first color transformation and the second color transformation can be a process related to color, such as image blurring, image brightness adjustment, and image saturation adjustment.

In some embodiments, the contrastive learning model CLM can further comprise an indexer submodel. In some embodiments, the first data augmentation mask and the second data augmentation mask can be inversed by using the indexer submodel to generate a first background mask and a second background mask. Next, a size of the first data augmentation mask, a size of the second data augmentation mask, a size of the first background mask, and a size of the second background mask can be adjusted by using the indexer submodel. After that, an element-wise multiplication process of an adjusted first data augmentation mask and the first image feature map can be performed by using the indexer submodel, the element-wise multiplication process of an adjusted second data augmentation mask and the second image feature map can be performed by using the indexer submodel, and a foreground feature map pair is generated. Next, the element-wise multiplication process of an adjusted first background mask and the first image feature map can be performed by using the indexer submodel, the element-wise multiplication process of an adjusted second background mask and the second image feature map can be performed by using the indexer submodel, a background feature map pair can be generated, and the foreground feature vector pair and the background feature vector pair can be generated according to the foreground feature map pair and the background feature map pair.

In some embodiments, the size of the first data augmentation mask, the size of the second data augmentation mask, the size of the first background mask, and the size of the second background mask can be adjusted to the same size of the first image feature map and the second image feature map.

In some embodiments, the element-wise multiplication process of the adjusted first data augmentation mask and the first image feature map can be performed to generate a first foreground feature map, the element-wise multiplication process of the adjusted second data augmentation mask and the second image feature map can be performed to generate a second foreground feature map, and the first foreground feature map and the second foreground feature map are taken as the foreground feature map pair.

In some embodiments, the element-wise multiplication process of the adjusted first background mask and the first image feature map can be performed to generate a first background feature map, the element-wise multiplication process of the adjusted second background mask and the second image feature map can be performed to generate a second background feature map, and the first background feature map and the second background feature map are taken as the background feature map pair.

In some embodiments, if the first data augmentation mask and the second data augmentation mask are binary masks, the above-mentioned inversion can transform a value of a pixel having an object in the first data augmentation mask and the second data augmentation mask from 1 to 0, and a value of a pixel not having an object in the first data augmentation mask and the second data augmentation mask from 0 to 1, to generate the first background mask and the second background mask.

It is noticed that, if the first data augmentation mask and the second data augmentation mask are ternary masks or multivariate masks, the value of the pixel having an object in the first data augmentation mask and the second data augmentation mask can be set as 1, and the value of the pixel not having an object in the first data augmentation mask and the second data augmentation mask can be set as 0. Also, the value of the pixel having an object in the first data augmentation mask and the second data augmentation mask can be set as 0, and the value of the pixel not having an object in the first data augmentation mask and the second data augmentation mask can be set as 1 to generate the first background mask and the second background mask.

In some embodiments, the contrastive learning model CLM can further comprise a multilayer perceptron (MLP) submodel. In some embodiments, a linear transformation of the foreground feature map pair can be performed by using the multilayer perceptron submodel to generate the foreground feature vector pair, and the linear transformation of the background feature map pair can be performed by using the multilayer perceptron submodel to generate the background feature vector pair.

In some embodiments, for the foreground feature vector pair, the linear transformation of the first foreground feature map and the second foreground feature map can be performed to generate the first foreground feature vector and the second foreground feature vector, and the first foreground feature vector and the second foreground feature vector are taken as the foreground feature vector pair. Next, for the background feature vector pair, the linear transformation of the first background feature map and the second background feature map can be performed to generate the first background feature vector and the second background feature vector, and the first background feature vector and the second background feature vector are taken as the background feature vector pair.

In some embodiments, the multilayer perceptron submodel can be a linear layer or a fully connection layer, and the multilayer perceptron submodel is configured to linear transformation a multidimensional feature map to a one-dimensional feature vector.

Furthermore, in step S220, the foreground loss and the background loss are calculated according to the foreground feature vector pair and the background feature vector pair. In some embodiments, for the foreground feature vector pair, a similar loss is calculated from the first foreground feature vector and the second foreground feature vector to generate the foreground loss. Next, for the background feature vector pair, the similar loss is calculated from the first background feature vector and the second background feature vector to generate the background loss.

In some embodiments, the above-mentioned similar loss is calculated according to the following formula 1:

7

$$L = \frac{z}{\|z\|_2} \cdot \frac{z'}{\|z'\|_2},$$ (formula 1)

wherein $z$ and $z'$ are feature vectors, $\|,\|_2$ is a function of Euclidean Norm, $$\frac{z}{\|z\|_2}$$

is $z$ after L2 normalization, $$\frac{z'}{\|z'\|_2}$$

is $z'$ after L2 normalization, and L is a sum of every elements after performing element-wise multiplication process of $z$ after L2 normalization and $z'$ after L2 normalization (i.e., the similar loss).

In other words, the foreground loss can be calculated by substitute the first foreground feature vector and the second foreground feature vector into the formula 1 mentioned above, and the background loss can be calculated by substitute the first background feature vector and the second background feature vector into the formula 1 mentioned above.

Furthermore, in step S230, the weighted loss calculation on the foreground loss and the background loss is performed by using a first weight and a second weight to generate the total loss T_LOSS, wherein the first weight corresponds to the foreground loss, and the second weight corresponds to the background loss. In some embodiments, the sum of the first weight and the second weight is 1, wherein the first weight and the second weight can be an average value obtained from training experiences in the past or a manual preset value. For example, the first weight is 0.7, and the second weight is 0.3. In some embodiments, the total loss T_LOSS is calculated according to the following formula 2:

$$T\_LOSS = 2 - 2 \times (\alpha \times loss1 + \beta \times loss2),$$ (formula 2), wherein $\alpha$ is the first weight, $\beta$ is the second weight, loss1 is the foreground loss, and loss2 is the background loss.

Furthermore, in step S240, whether a recursion end condition has been met is determined according to the total loss. If the recursion end condition is met, step S250 will be executed. Otherwise, if the recursion end condition is not met, step S260 will be executed. In some embodiments, the recursion end condition is met when the total loss is less than a preset loss threshold, or the total loss is converged to a specific value after multiple recursion (i.e., the more similar the foreground feature vectors are, the better; and the more similar the background feature vectors are, the better), wherein the loss threshold can be an average value obtained from training experiences in the past or a manual preset value.

Furthermore, in step S250, a parameter of a machine learning model is adjusted by using the first encoder ENCODER1 of the contrastive learning model CLM. In some embodiments, the machine learning method 200 can select a neural network structure corresponding to a downstream task (e.g., image classification) for the structure of the machine learning model, and there is no particular limitation. In other words, in the downstream task, the pre-trained first encoder ENCODER1 can be applied to a neural network layer of any machine learning model. Therefore, in the training phase of the machine learning model, only a very small quantity of labeled data is needed to slightly adjust the parameter of the first encoder ENCODER1 to complete the training of the machine learning model.

Furthermore, in step S260, the parameter of the first encoder ENCODER1 of the contrastive learning model CLM is adjusted by using the total loss, the parameter of the second encoder is adjusted by using the adjusted parameter of the first encoder and the preset multiple, a new training image and a new image mask corresponding to the new training image are captured, and the new training image and the new image mask are taken as the training image and the image mask, thereby back to execute step S210 to train the contrastive learning model CLM. In other words, the new training image and the new image mask corresponding to the new training image can be captured continuously, and the contrastive learning model CLM can be trained by using the new training image and the new image mask. In some embodiments, a back propagation calculation of the first encoder ENCODER1 of the contrastive learning model CLM can be performed according to the total loss to adjust the parameter of the first encoder ENCODER1. After that, a product of the adjusted parameter of the first encoder ENCODER1 and the preset multiple can be taken as the adjusted parameter of the second encoder.

By the above-mentioned steps, the machine learning device 100 can apply data without manual label to the contrastive learning model CLM directly to calculate the total loss by using the foreground feature vector pair and the background feature vector pair generated from the training image and the image mask corresponding to the training image, and the first encoder ENCODER1 of the contrastive learning model CLM is updated. Thus, the essential detail for the downstream task can be presented precisely (i.e., the feature extraction of the region of interest in the image can be enhance). For example, improving the clarity of medical images, the effectiveness of biometrics, the segmentation of self-driving images, etc. Therefore, the pre-trained first encoder ENCODER1 can be applied to a neural network layer of any machine learning model, which will greatly reduce training samples and corresponding training labels needed for training the machine learning model.

Figure 3:
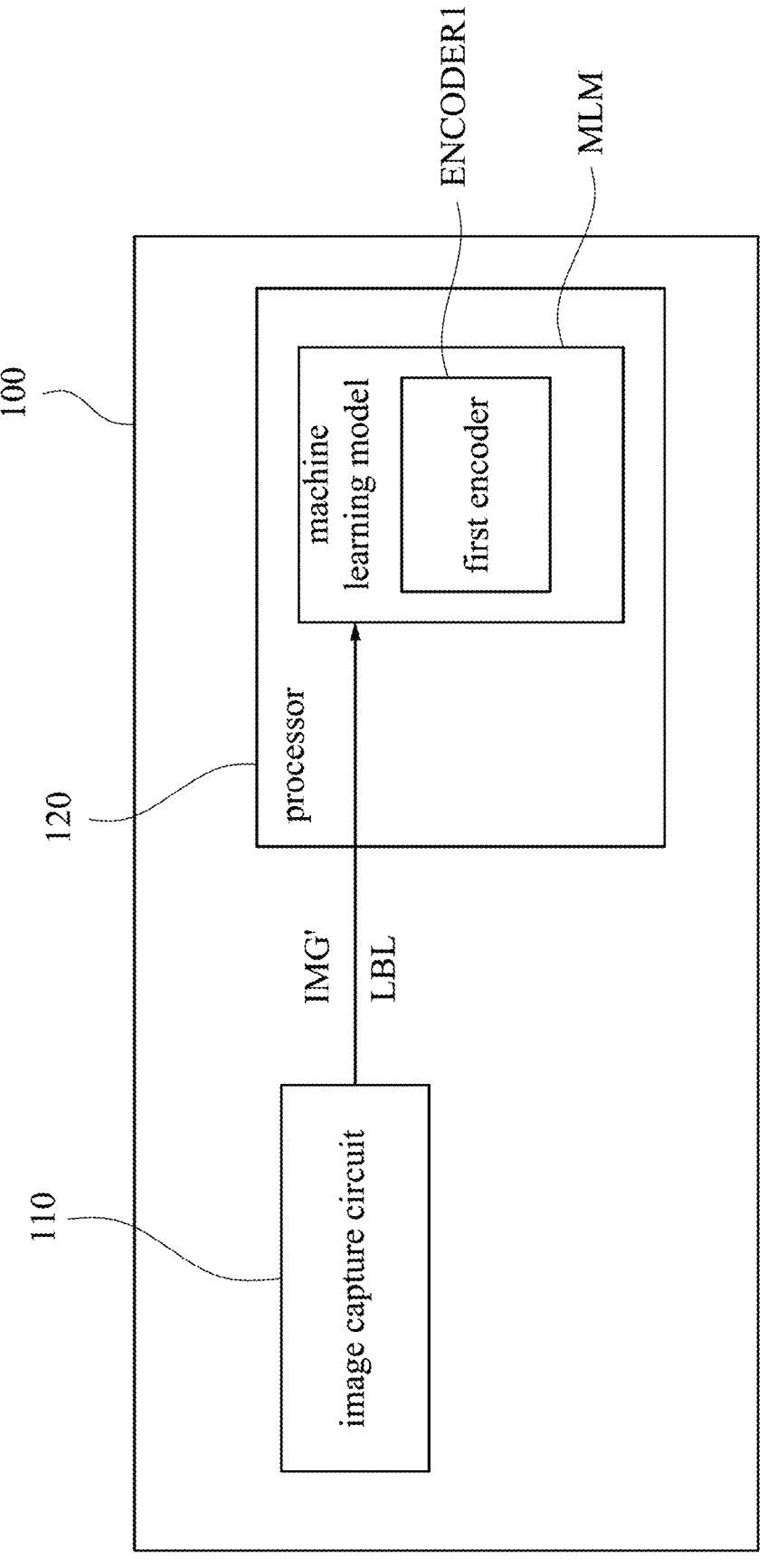
FIG. 3 is a block diagram illustrating a machine learning device according to some embodiments of the present disclosure.

Reference is also made to FIG. 3. FIG. 3 is a block diagram illustrating a machine learning device 100 according to some embodiments of the present disclosure. In this embodiment, the machine learning device 100 comprises an image capture circuit 110 and a processor 120. The image capture circuit 110 is configured to capture training images IMG' with training labels LBL. The processor 120 connects to the image capture circuit 110. The processor 120 executes a machine learning model MLM based on a corresponding software or firmware command program, wherein the machine learning model MLM comprises a pre-trained first encoder ENCODER1. In the training phase, the processor 120 only needs a small quantity of the training labels LBL and small quantity of the training images IMG' to slightly adjust the parameter of the first encoder ENCODER1 to complete the training of the machine learning model MLM.

Figure 4:
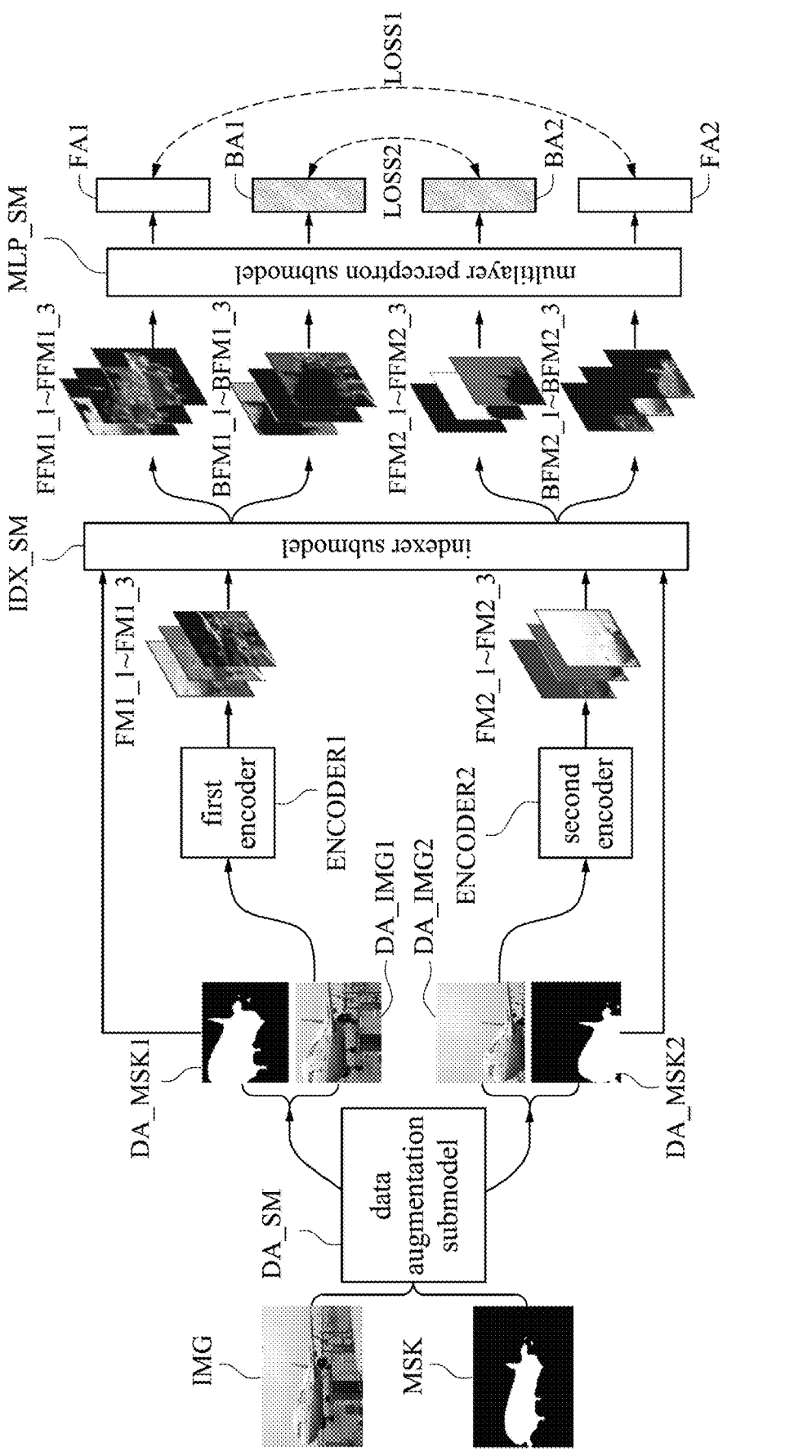
FIG. 4 is a schematic diagram illustrating a structure of a contrastive learning model according to some embodiments of the present disclosure.

Reference is also made to FIG. 4. FIG. 4 is a schematic diagram illustrating a structure of a contrastive learning model CLM according to some embodiments of the present disclosure. As shown in FIG. 4, the contrastive learning model CLM comprises a data augmentation submodel DA_SM, a first encoder ENCODER1, a second encoder ENCODER2, an indexer submodel IDX_SM, and a multilayer perceptron submodel MLP_SM.

Figure 5:
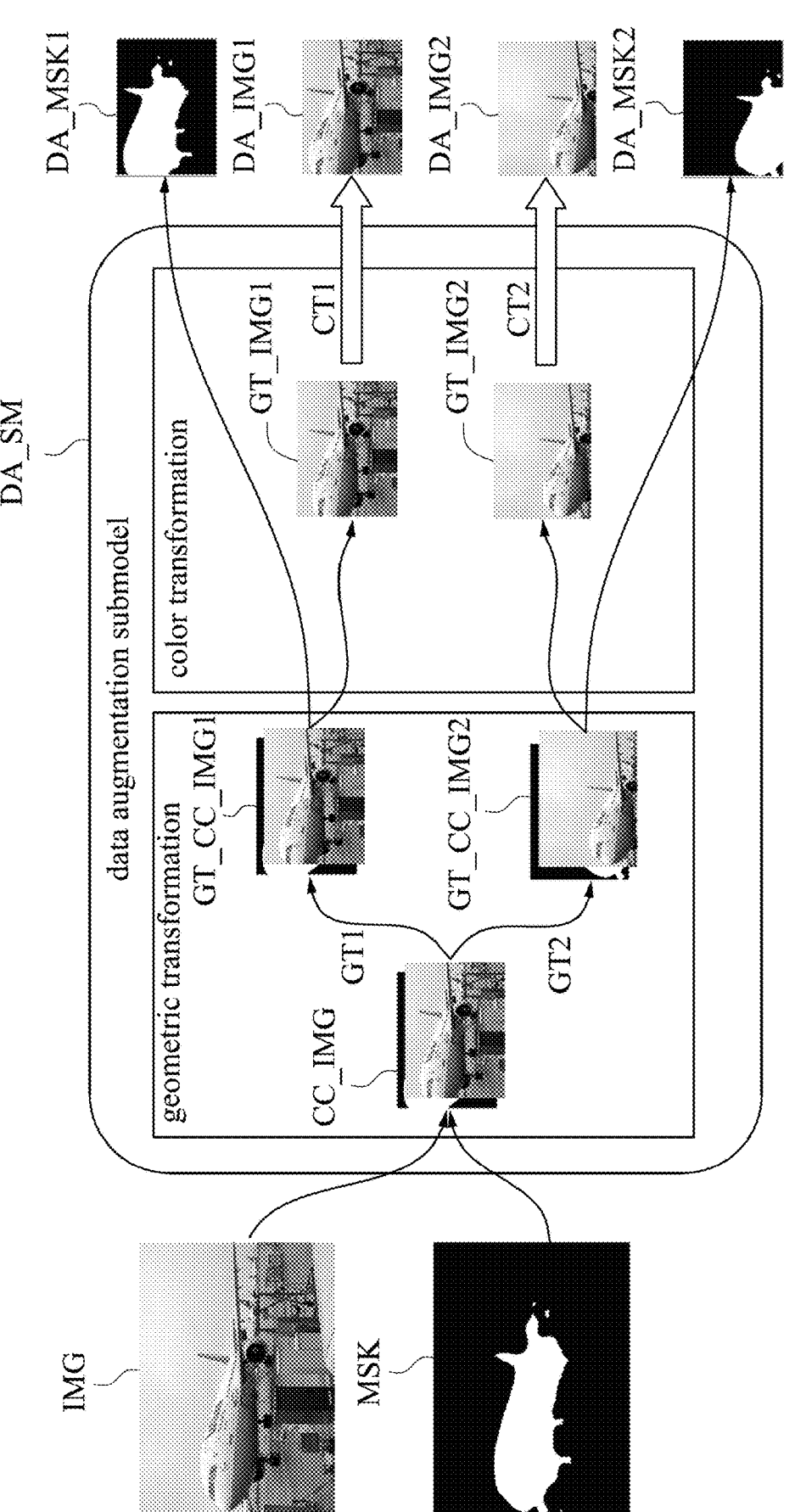
FIG. 5 is a schematic diagram illustrating a process of a data augmentation submodel according to some embodiments of the present disclosure.

First, the processor 120 inputs a training image IMG and an image mask MSK corresponding to the training image IMG into the data augmentation submodel DA_SM, the data augmentation submodel DA_SM can transform the training image IMG and the image mask MSK into a first data augmentation images DA_IMG1 and first data augmentation masks DA_MSK1 respectively, and the data augmentation submodel DA_SM can also transform the training image IMG and the image mask MSK into a second data augmentation images DA_IMG2 and second data augmentation masks DA_MSK2 respectively. For the detail description, reference is also made to FIG. 5. FIG. 5 is a schematic diagram illustrating a process of a data augmentation submodel DA_SM according to some embodiments of the present disclosure. Assumed that the training image IMG is an image with three channels (e.g., 224×224×3 (RGB color space)), and the image mask MSK is a corresponding binary mask with one channel (e.g., 224×224×1). The data augmentation submodel DA_SM can concatenate the training image IMG with the image mask MSK to generate a concatenated image CC_IMG with four channels (e.g., 224×224×4), and perform a first geometric transformation GT1 and a second geometric transformation GT2 on the concatenated image CC_IMG to generate a first geometric transformed concatenated image GT_CC_IMG1 and a second geometric transformed concatenated image GT_CC_IMG2.

Furthermore, the data augmentation submodel DA_SM can split the first geometric transformed concatenated image GT_CC_IMG1 with four channels into a first data augmentation mask DA_MSK1 with one channel (e.g., 224×224×1) and a first geometric transformed image GT_IMG1 with three channels (e.g., 224×224×3), and split the second geometric transformed concatenated image GT_CC_IMG2 with four channels into a second data augmentation mask DA_MSK2 with one channel (e.g., 224×224×1) and a second geometric transformed image GT_IMG2 with three channels (e.g., 224×224×3).

Furthermore, the data augmentation submodel DA_SM can perform a first color transformation CT1 and a second color transformation CT2 on the first geometric transformed image GT_IMG1 with three channels and the second geometric transformed image GT_IMG2 with three channels to generate the first data augmentation images DA_IMG1 with three channels and the second data augmentation images DA_IMG2 with three channels.

As shown in FIG. 4, the data augmentation submodel DA_SM can input the first data augmentation images DA_IMG1 and the second data augmentation images DA_IMG2 into the first encoder ENCODER1 and the second encoder ENCODER2 respectively to generate first image feature maps FM1_1-FM1_3 and second image feature maps FM2_1-FM2_3 respectively.

It is noticed that, for clarity of the process of the first data augmentation images DA_IMG1 and the second data augmentation images DA_IMG2 by the first encoder ENCODER1 and the second encoder ENCODER2 and the process of various subsequence feature maps, only a simple example is mentioned to illustrate the process of the first encoder ENCODER1 and the second encoder ENCODER2 to generate a specific quantity of the first image feature maps and the second image feature maps.

However, may not only three first image feature maps and three second image feature maps are generated in practice. The quantity of image feature maps depends on the structures of the first encoder ENCODER1 and the second encoder ENCODER2. For example, in practice, if the first encoder ENCODER1 and the second encoder ENCODER2 are ResNet50 structures, the first encoder ENCODER1 and the second encoder ENCODER2 will generate 2048 image feature maps respectively.

Thus, the data augmentation submodel DA_SM can input the first image feature maps FM1_1~FM1_3 and the corresponding first data augmentation mask DA_MSK1 into the indexer submodel IDX_SM to generate first foreground feature maps FFM1_1~FFM1_3 and first background feature maps BFM1_1~BFM1_3. Also, the data augmentation submodel DA_SM can input the second image feature maps FM2_1~FM2_3 and the corresponding second data augmentation mask DA_MSK2 into the indexer submodel IDX_SM to generate second foreground feature maps FFM2_1~FFM2_3 and second background feature maps BFM2_1~BFM2_3.

Figure 6:
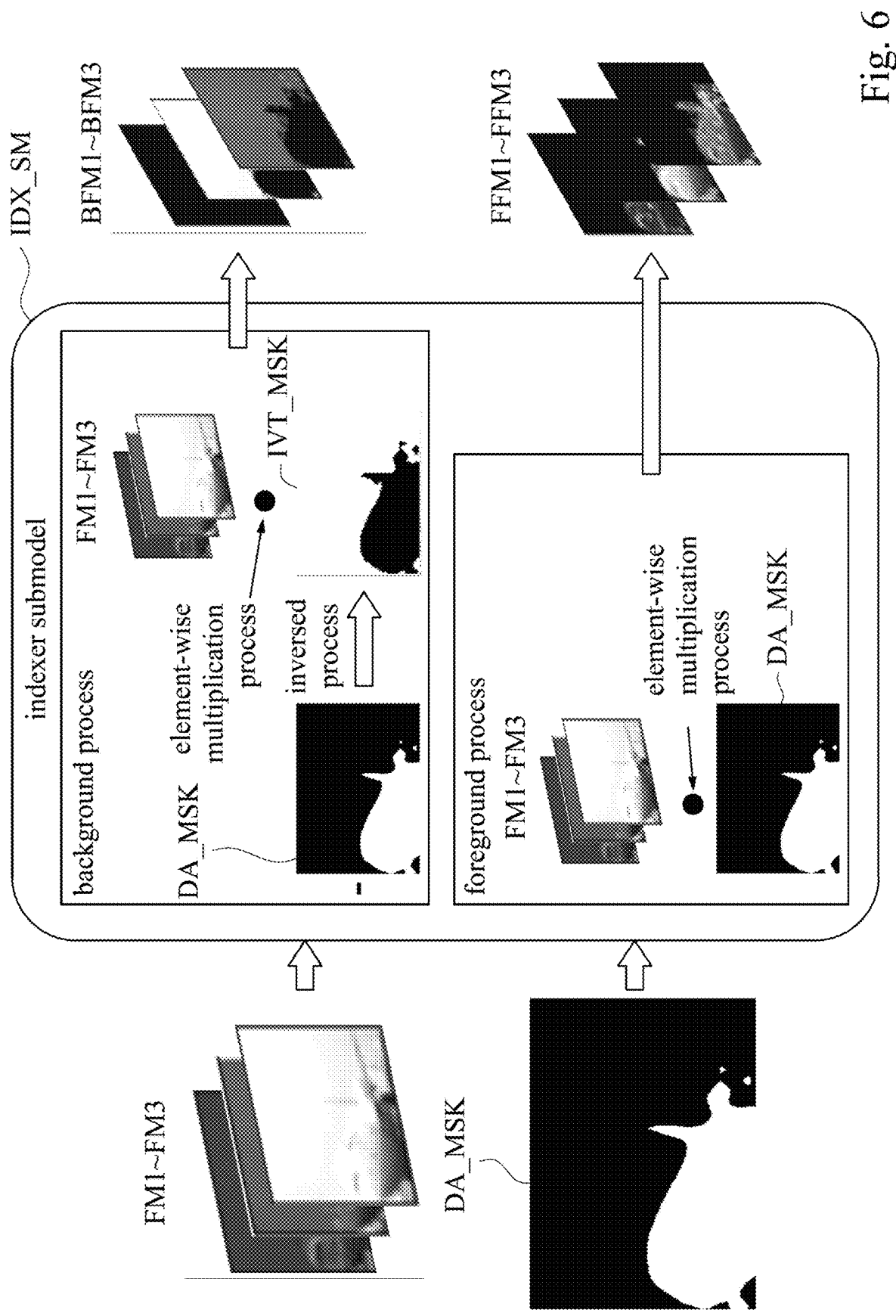
FIG. 6 is a schematic diagram illustrating a process of an indexer submodel according to some embodiments of the present disclosure.

Reference is also made to FIG. 6. FIG. 6 is a schematic diagram illustrating a process of an indexer submodel IDX_SM according to some embodiments of the present disclosure. Assume that image feature maps FM1~FM3 and a corresponding data augmentation mask DA_MSK are inputted into the indexer submodel IDX_SM, the indexer submodel IDX_SM can adjust the size of the data augmentation mask DA_MSK, and the indexer submodel IDX_SM can perform a foreground process and a background process respectively on the image feature maps FM1~FM3 and the adjusted data augmentation mask DA_MSK to generate foreground feature maps FFM1~FFM3 and background feature maps BFM1~BFM3 respectively.

In detail, for the background process, the indexer submodel IDX_SM can perform an inverse process of the adjusted data augmentation mask DA_MSK to generate a background mask IVT_MSK, and perform an element-wise multiplication process of the image feature maps FM1~FM3 and the background mask IVT_MSK to generate the background feature maps BFM1~BFM3. Also, for the foreground process, the indexer submodel IDX_SM can perform the element-wise multiplication process of the image feature maps FM1~FM3 and the adjusted data augmentation mask DA_MSK to generate the foreground feature maps FFM1~FFM3.

By the same process, the data augmentation submodel DA_SM can generate the first foreground feature maps FFM1_1~FFM1_3 and the first background feature maps BFM1_1~BFM1_3 according to the first image feature maps FM1_1~FM1_3 and the corresponding first data augmentation mask DA_MSK1, and the data augmentation submodel DA_SM can generate the second foreground feature maps FFM2_1~FFM2_3 and the second background feature maps BFM2_1~BFM2_3 according to the second image feature maps FM2_1~FM2_3 and the corresponding second data augmentation mask DA_MSK2.

As shown in FIG. 4, the data augmentation submodel DA_SM can input the first foreground feature maps FFM1_1~FFM1_3 and the second foreground feature maps FFM2_1~FFM2_3 into the multilayer perceptron submodel MLP_SM to perform a linear transformation to generate a first foreground feature vector FA1 and a second foreground feature vector FA2. Also, the data augmentation submodel DA_SM can input the first background feature maps BFM1_1~BFM1_3 and the second background feature maps BFM2_1~BFM2_3 into the multilayer perceptron submodel MLP_SM to perform the linear transformation, and a first background feature vector BA1 and a second background feature vector BA2 are generated.

Thus, the processor 120 can calculate a foreground loss LOSS1 according to the first foreground feature vector FA1 and the second foreground feature vector FA2, and calculate a background loss LOSS2 according to the first background feature vector BA1 and the second background feature vector BA2. Therefore, the processor 120 can calculate a total loss according to the foreground loss LOSS1 and the background loss LOSS2, and perform a back propagation calculation of the first encoder ENCODER1 by using the total loss to update the parameter of the first encoder ENCODER1. Furthermore, the processor 120 can set the parameter of the second encoder ENCODER2 as a product of the preset multiple and the updated parameter of the first encoder ENCODER1.

Therefore, the parameter of the first encoder ENCODER1 and the parameter of the second encoder ENCODER2 can be updated continuously until the recursion end condition is met, and complete the pre-training of the first encoder ENCODER1 and the second encoder ENCODER2.

According to the above descriptions, the machine learning method and device provided by the present disclosure can perform a data augmentation of an image and a mask in a contrastive learning model and a feature extraction of a foreground and a background to calculate a foreground loss and a background loss. Furthermore, the machine learning method and device perform a weighted loss calculation on the foreground loss and the background loss by using a weight of the foreground and a weight of the background to generate a total loss. Thus, a first encoder and a second encoder of the contrastive learning model can be updated according to the total loss until a recursion end condition is met, and the pre-trained first encoder is applied to a neural network layer of other machine learning model after the recursion end condition is met. Therefore, the essential detail for the downstream task can be presented precisely, which will greatly reduce training samples and corresponding training labels needed for training the machine learning model.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A machine learning method, comprising:
   (a) applying a contrastive learning model to a training image and an image mask corresponding to the training image to generate a foreground feature vector pair and a background feature vector pair corresponding to the training image, wherein the contrastive learning model comprises a first encoder and a second encoder, and the first encoder corresponds to one of the foreground feature vector pair and one of the background feature vector pair, and the second encoder corresponds to the other one of the foreground feature vector pair and the other one of the background feature vector pair;
   (b) calculating a foreground loss and a background loss according to the foreground feature vector pair and the background feature vector pair;

(c) performing a weighted loss calculation on the foreground loss and the background loss by using a first weight and a second weight to generate a total loss, wherein the first weight corresponds to the foreground loss, and the second weight corresponds to the background loss;
   (d) determining whether a recursion end condition is met according to the total loss;
   (e) adjusting a parameter of a machine learning model by using the first encoder when the recursion end condition is met; and
   (f) adjusting a parameter of the first encoder by using the total loss, adjusting a parameter of the second encoder by using the adjusted parameter of the first encoder and a preset multiple, capturing a new training image and a new image mask corresponding to the new training image, and performing step (a) to step (d) by taking the new training image and the new image mask as the training image and the image mask when the recursion end condition is not met.

2. The machine learning method of claim 1, wherein the contrastive learning model comprises a data augmentation submodel, and step (a) comprises:
   (a1) performing a first geometric transformation on the training image and the image mask by using the data augmentation submodel to generate a first geometric transformed image and a first data augmentation mask corresponding to the first geometric transformed image;
   (a2) performing a second geometric transformation on the training image and the image mask by using the data augmentation submodel to generate a second geometric transformed image and a second data augmentation mask corresponding to the second geometric transformed image, wherein the second geometric transformation is different from the first geometric transformation; and
   (a3) generating a first image feature map by using the first encoder according to the first geometric transformed image, generating a second image feature map by using the second encoder according to the second geometric transformed image and generating the foreground feature vector pair and the background feature vector pair according to the first image feature map and the second image feature map.

3. The machine learning method of claim 2, wherein the preset multiple exists between the parameter of the first encoder and the parameter of the second encoder, and the first encoder and the second encoder have the same structure.

4. The machine learning method of claim 2, wherein the first encoder and the second encoder are residual networks or visual geometry group networks.

5. The machine learning method of claim 2, wherein step (a3) comprises:
   performing a first color transformation on the first geometric transformed image by using the data augmentation submodel to generate a first data augmentation image;
   performing a second color transformation on the second geometric transformed image by using the data augmentation submodel to generate a second data augmentation image, wherein the second color transformation is different from the first color transformation; and
   generating the first image feature map by using the first encoder according to the first data augmentation image, generating the second image feature map by using the second encoder according to the second data augmentation image, and generating the foreground feature vector pair and the background feature vector pair according to the first image feature map and the second image feature map.

6. The machine learning method of claim 2, wherein the contrastive learning model further comprises an indexer submodel, and step (a3) further comprises:

inversing the first data augmentation mask and the second data augmentation mask by using the indexer submodel to generate a first background mask and a second background mask;

adjusting a size of the first data augmentation mask, a size of the second data augmentation mask, a size of the first background mask, and a size of the second background mask by using the indexer submodel;

performing an element-wise multiplication process on an adjusted first data augmentation mask and the first image feature map by using the indexer submodel, performing the element-wise multiplication process on an adjusted second data augmentation mask and the second image feature map by using the indexer submodel, and generating a foreground feature map pair; and performing the element-wise multiplication process on an adjusted first background mask and the first image feature map by using the indexer submodel, performing the element-wise multiplication process on an adjusted second background mask and the second image feature map by using the indexer submodel, generating a background feature map pair, and generating the foreground feature vector pair and the background feature vector pair according to the foreground feature map pair and the background feature map pair.

7. The machine learning method of claim 6, wherein the contrastive learning model further comprises a multilayer perceptron submodel, wherein step (a3) further comprises:

performing a linear transformation on the foreground feature map pair by using the multilayer perceptron submodel to generate the foreground feature vector pair, and performing the linear transformation on the background feature map pair by using the multilayer perceptron submodel to generate the background feature vector pair.

8. The machine learning method of claim 7, wherein the multilayer perceptron submodel is a linear layer or a fully connection layer.

9. The machine learning method of claim 1, wherein the first weight corresponding to the foreground loss is larger than the second weight corresponding to the background loss, and the weighted loss calculation is related to a mean square error loss calculation.

10. The machine learning method of claim 1, wherein the total loss is calculated according to the following formula:

$$2-2\times(\alpha\times loss1+\beta\times loss2)$$

wherein $\alpha$ is the first weight, $\beta$ is the second weight, loss1 is the foreground loss, and loss2 is the background loss.

11. A machine learning device, comprising:

an image capture circuit, configured to capture a training image;

a processor, connected to the image capture circuit, and executing a contrastive learning model, wherein the contrastive learning model comprises a first encoder and a second encoder and the processor is configured to:

performing an object recognition process on the training image to generate an image mask corresponding to the training image;

applying the contrastive learning model to the training image and the image mask corresponding to the training image to generate a foreground feature vector pair and a background feature vector pair corresponding to the training image;

calculating a foreground loss and a background loss according to the foreground feature vector pair and the background feature vector pair, wherein the first encoder corresponds to one of the foreground feature vector pair and one of the background feature vector pair, and the second encoder corresponds to the other one of the foreground feature vector pair and the other one of the background feature vector pair;

performing a weighted loss calculation on the foreground loss and the background loss by using a first weight and a second weight to generate a total loss, wherein the first weight corresponds to the foreground loss, and the second weight corresponds to the background loss; and adjusting a parameter of the first encoder of the contrastive learning model by using the total loss, wherein the trained first encoder is configured to adjust a parameter of a machine learning model.

12. The machine learning device of claim 11, wherein the contrastive learning model comprises a data augmentation submodel, and the processor is further configured to:

performing a first geometric transformation on the training image and the image mask by using the data augmentation submodel to generate a first geometric transformed image and a first data augmentation mask corresponding to the first geometric transformed image;

performing a second geometric transformation on the training image and the image mask by using the data augmentation submodel to generate a second geometric transformed image and a second data augmentation mask corresponding to the second geometric transformed image, wherein the second geometric transformation is different from the first geometric transformation; and generating a first image feature map by using the first encoder according to the first geometric transformed image, generating a second image feature map by using the second encoder of the contrastive learning model according to the second geometric transformed image and generating the foreground feature vector pair and the background feature vector pair according to the first image feature map and the second image feature map.

13. The machine learning device of claim 12, wherein a preset multiple exists between the parameter of the first encoder and the parameter of the second encoder, and the first encoder and the second encoder have the same structure.

14. The machine learning device of claim 12, wherein the first encoder and the second encoder are residual networks or visual geometry group networks.

15. The machine learning device of claim 12, wherein the processor is further configured to:

performing a first color transformation on the first geometric transformed image by using the data augmentation submodel to generate a first data augmentation image;

performing a second color transformation on the second geometric transformed image by using the data augmentation submodel to generate a second data augmentation image, wherein the second color transformation is different from the first color transformation; and generating the first image feature map by using the first encoder according to the first data augmentation image, generating the second image feature map by using the second encoder according to the second data augmentation image and generating the foreground feature vector pair and the background feature vector pair according to the first image feature map and the second image feature map.

16. The machine learning device of claim 12, wherein the contrastive learning model further comprises an indexer submodel, wherein the processor is further configured to:

inversing the first data augmentation mask and the second data augmentation mask by using the indexer submodel to generate a first background mask and a second background mask;

adjusting a size of the first data augmentation mask, a size of the second data augmentation mask, a size of the first background mask, and a size of the second background mask by using the indexer submodel;

performing an element-wise multiplication process on an adjusted first data augmentation mask and the first image feature map by using the indexer submodel, performing the element-wise multiplication process on an adjusted second data augmentation mask and the second image feature map by using the indexer submodel, and generating a foreground feature map pair; and performing the element-wise multiplication process on an adjusted first background mask and the first image feature map by using the indexer submodel, performing the element-wise multiplication process on an adjusted second background mask and the second image feature map by using the indexer submodel, generating a background feature map pair, and generating the foreground feature vector pair and the background feature vector pair according to the foreground feature map pair and the background feature map pair.

17. The machine learning device of claim 16, wherein the contrastive learning model further comprises a multilayer perceptron submodel, and the processor is further configured to:

performing a linear transformation on the foreground feature map pair, by using the multilayer perceptron submodel to generate the foreground feature vector pair, and performing the linear transformation on the background feature map pair by using the multilayer perceptron submodel to generate the background feature vector pair.

18. The machine learning device of claim 17, wherein the multilayer perceptron submodel is a linear layer or a fully connection layer.

19. The machine learning device of claim 11, wherein the first weight corresponding to the foreground loss is larger than the second weight corresponding to the background loss, and the weighted loss calculation is related to a mean square error loss calculation.

20. The machine learning device of claim 11, wherein the total loss is calculated according to the following formula:

$$2 - 2 \times (\alpha \times \text{loss1} + \beta \times \text{loss2})$$

wherein $\alpha$ is the first weight, $\beta$ is the second weight, loss1 is the foreground loss, and loss2 is the background loss.

* * * * *